US007895387B1

(12) United States Patent
Khodabandehlou et al.

(10) Patent No.: US 7,895,387 B1
(45) Date of Patent: Feb. 22, 2011

(54) DEVICES AND METHODS FOR SHARING COMMON TARGET DEVICE WITH TWO DIFFERENT HOSTS ACCORDING TO COMMON COMMUNICATION PROTOCOL

(75) Inventors: Hamid Khodabandehlou, Milpitas, CA (US); Syed Babar Raza, San Jose, CA (US); Michael Lewis, Boise, ID (US); Scott Swindle, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 125 days.

(21) Appl. No.: 11/904,758

(22) Filed: Sep. 27, 2007

(51) Int. Cl.
*G06F 3/00* (2006.01)
*G06F 13/14* (2006.01)
*G06F 13/36* (2006.01)
*G06F 13/00* (2006.01)

(52) U.S. Cl. .................. 710/316; 710/11; 710/305; 710/306; 710/315

(58) Field of Classification Search ............... 710/316, 710/11, 305, 306, 315
See application file for complete search history.

(56) References Cited

U.S. PATENT DOCUMENTS

| 4,641,261 A | 2/1987 | Dwyer et al. |
| 4,701,913 A | 10/1987 | Nelson |
| 4,713,757 A | 12/1987 | Davidson et al. |
| 4,862,355 A | 8/1989 | Newman et al. |
| 4,866,606 A | 9/1989 | Kopetz |
| 4,890,222 A | 12/1989 | Kirk |
| 5,289,580 A | 2/1994 | Latif et al. |
| 5,388,249 A | 2/1995 | Hotta et al. |
| 5,392,421 A | 2/1995 | Lennartsson |
| 5,402,394 A | 3/1995 | Turski |
| 5,416,909 A | 5/1995 | Long et al. |

(Continued)

FOREIGN PATENT DOCUMENTS

JP 404200119 A1 7/1992

(Continued)

OTHER PUBLICATIONS

Compaq Computer Corporation et al., *Universal Serial Bus Specification—Rev 2.0*, Apr. 27, 2000, pp. ii, 18-19, 33-34, 120, 145, 196-207, 227-228.

(Continued)

*Primary Examiner*—Mark Rinehart
*Assistant Examiner*—Jeremy S Cerullo

(57) ABSTRACT

A controller circuit provides communication paths between multiple host devices and a target device. The controller circuit includes a first host idle detection circuit that determines when a first host interface (I/F) is in an idle state, an idle state being when the first host I/F is not communicating with the controller circuit. A switch circuit can selectively enables a controllable communication path between a second host I/F and a target device I/F. A first response circuit can be coupled to the first host I/F and output predetermined responses from the first host I/F in response to communications received on the first host I/F. The first response circuit outputting a predetermined response when at least the controller circuit has enabled the controllable communication path between a second host I/F and the target device I/F and disabled the controllable communication path between the first host I/F and the target device I/F.

18 Claims, 11 Drawing Sheets

U.S. PATENT DOCUMENTS

| | | | |
|---|---|---|---|
| 5,428,748 | A | 6/1995 | Davidson et al. |
| 5,461,723 | A | 10/1995 | Shah et al. |
| 5,488,657 | A | 1/1996 | Lynn et al. |
| 5,574,859 | A | 11/1996 | Yeh |
| 5,577,213 | A | 11/1996 | Avery et al. |
| 5,586,268 | A | 12/1996 | Chen et al. |
| 5,606,672 | A | 2/1997 | Wade |
| 5,615,344 | A | 3/1997 | Corder |
| 5,621,902 | A | 4/1997 | Cases et al. |
| 5,628,001 | A | 5/1997 | Cepuran |
| 5,630,147 | A | 5/1997 | Datta et al. |
| 5,634,074 | A | 5/1997 | Devon et al. |
| 5,642,489 | A | 6/1997 | Bland et al. |
| 5,671,355 | A | 9/1997 | Collins |
| 5,675,813 | A | 10/1997 | Holmdahl |
| 5,687,346 | A | 11/1997 | Shinohara |
| 5,701,429 | A | 12/1997 | Legvold et al. |
| 5,748,911 | A | 5/1998 | Maguire et al. |
| 5,748,923 | A | 5/1998 | Eitrich |
| 5,754,799 | A | 5/1998 | Hiles |
| 5,758,188 | A | 5/1998 | Appelbaum et al. |
| 5,767,844 | A | 6/1998 | Stoye |
| 5,774,744 | A | 6/1998 | Story et al. |
| 5,778,218 | A | 7/1998 | Gulick |
| 5,781,028 | A | 7/1998 | Decuir |
| 5,794,033 | A | 8/1998 | Aldebert et al. |
| 5,802,558 | A | 9/1998 | Pierce |
| 5,828,854 | A | 10/1998 | Wade |
| 5,838,907 | A | 11/1998 | Hansen |
| 5,974,486 | A | 10/1999 | Siddappa |
| 6,012,103 | A | 1/2000 | Sartore et al. |
| 6,012,115 | A | 1/2000 | Chambers et al. |
| 6,049,885 | A | 4/2000 | Gibson et al. |
| 6,067,628 | A | 5/2000 | Krithivas et al. |
| 6,085,325 | A | 7/2000 | Jackson et al. |
| 6,085,328 | A | 7/2000 | Klein et al. |
| 6,122,676 | A | 9/2000 | Brief et al. |
| 6,125,420 | A | 9/2000 | Eidson |
| 6,145,045 | A | 11/2000 | Falik et al. |
| 6,148,354 | A | 11/2000 | Ban et al. |
| 6,173,355 | B1 | 1/2001 | Falik et al. |
| 6,175,883 | B1 | 1/2001 | Kvamme et al. |
| 6,189,060 | B1 | 2/2001 | Kodama |
| 6,212,165 | B1 | 4/2001 | Mann et al. |
| 6,226,291 | B1 | 5/2001 | Chauvel et al. |
| 6,233,640 | B1 | 5/2001 | Luke et al. |
| 6,279,060 | B1 | 8/2001 | Luke et al. |
| 6,311,294 | B1 | 10/2001 | Larky et al. .................... 714/44 |
| 6,366,980 | B1 | 4/2002 | Haines et al. |
| 6,389,495 | B1 | 5/2002 | Larky et al. |
| 6,415,343 | B1 | 7/2002 | Fensore et al. |
| 6,505,267 | B2 | 1/2003 | Luke et al. .................. 710/315 |
| 6,513,128 | B1 | 1/2003 | Wang et al. |
| 6,529,988 | B1 | 3/2003 | Yoshikawa et al. |
| 6,615,306 | B1 | 9/2003 | Ajanovic |
| 6,622,251 | B1 | 9/2003 | Lindskog et al. |
| 6,678,761 | B2 | 1/2004 | Garney et al. |
| 6,684,272 | B1 | 1/2004 | Leete et al. |
| 6,718,412 | B2 | 4/2004 | Purcell et al. |
| 6,760,852 | B1 | 7/2004 | Gulick |
| 6,816,929 | B2 | 11/2004 | Ueda |
| 6,816,976 | B2 | 11/2004 | Wright et al. |
| 6,970,419 | B1 | 11/2005 | Kalkunte et al. |
| 7,007,122 | B2 | 2/2006 | Solomon et al. |
| 7,010,638 | B2 | 3/2006 | Deng et al. |
| 7,054,980 | B2 | 5/2006 | Wurzburg |
| 7,073,010 | B2 | 7/2006 | Chen et al. |
| 7,080,189 | B1 | 7/2006 | Luttmann .................. 710/313 |
| 7,162,565 | B1 | 1/2007 | Kolokowsky et al. ....... 710/313 |
| 7,213,096 | B2 * | 5/2007 | Keys et al .................. 710/313 |
| 7,231,485 | B2 | 6/2007 | Harris et al. ................. 710/315 |
| 7,478,191 | B2 * | 1/2009 | Wurzburg et al. ........... 710/316 |
| 6,199,122 | B1 | 9/2010 | Kobayashi |
| 6,272,644 | B1 | 9/2010 | Urade et al. |
| 6,618,788 | B1 | 9/2010 | Jacobs |
| 2003/0185249 | A1 | 10/2003 | Davies et al. |
| 2006/0036558 | A1 | 2/2006 | Mathews |
| 2007/0079045 | A1 | 4/2007 | Luke .......................... 710/313 |

FOREIGN PATENT DOCUMENTS

| | | |
|---|---|---|
| JP | 410097303 A1 | 4/1998 |
| JP | 410097309 A1 | 4/1998 |

OTHER PUBLICATIONS

Cypress Semiconductor Corporation, *MoBL-USBTM FX2LP18 USB Microcontroller*, 2007.

"USB 2.0 mux interfaces USB, non-USB devices", *EE Times Asia*, May 15, 2007, found on the Internet at http:/www.eetasia.com/ART_8800464295_590626_NP_870689ba.HTM?1000013030&8800464295&click_from=1000013030,8619953561,2007-05-15,EEOL,EENEWS.

Intersil Americas Inc., *ISL54200 Data Sheet FN6408.0*, Jan. 24, 2007.

USPTO Notice of Allowance for U.S. Appl. No. 11/240,908 dated Sep. 14, 2009; 4 pages.

USPTO Notice of Allowance for U.S. Appl. No. 11/240,908 dated Jun. 11, 2009; 4 pages.

USPTO Final Rejection for U.S. Appl. No. 11/240,908 dated Nov. 14, 2008; 11 pages.

USPTO Non-Final Rejection for U.S. Appl. No. 11/240,908 dated Apr. 8, 2008; 11 pages.

USPTO Final Rejection for U.S. Appl. No. 11/240,908 dated Nov. 14, 2007; 10 pages.

USPTO Non-Final Rejection for U.S. Appl. No. 11/240,908 dated Mar. 28, 2007; 6 pages.

USPTO Notice of Allowance for U.S. Appl. No.10/160,442 dated Mar. 2, 2006; 7 pages.

USPTO Final Rejection for U.S. Appl. No. 10/160,442 dated Dec. 23, 2005; 10 pages.

USPTO Non-Final Rejection for U.S. Appl. No. 10/160,442 dated Oct. 17, 2005; 8 pages.

USPTO Non-Final Rejection for U.S. Appl. No. 10/160,442 dated Jul. 22, 2005; 7 pages.

USPTO Advisory Action for U.S. Appl. No. 10/160,442 dated Apr. 22, 2005; 3 pages.

USPTO Final Rejection for U.S. Appl. No. 10/160,442 dated Feb. 9, 2005; 8 pages.

USPTO Non-Final Rejection for U.S. Appl. No. 10/160,442 dated Aug. 25, 2004; 7 pages.

USPTO Notice of Allowance for U.S. Appl. No. 10/796,872 dated Sep. 6, 2006; 6 pages.

Universal Serial Bus Mass Storage Class Specification Overview Revision 1.2 USB Implementers Forum dated Jun. 23, 2003; 7 pages.

Universal Serial Bus Mass Storage Class Control/Bulk-Only Transport Revision 1.0 USB Implementers Forum; Sep. 31, 1999; 22 pages.

Universal Serial Bus Mass Storage Class Control/Bulk/Interrupt Revision 1.0 USB Implementers Forum dated Dec. 14, 1998; 26 pages.

CY4611 - FX2 USB to ATA/CF Reference design Notes Cypress Semiconductor Corporation dated Nov. 2010; 7 pages.

CY7C68013 EZ-USB FX2 USB Microcontroller High Speed USB Peripheral Controller Cypress Semiconductor Corporation dated Jun. 21, 2002; 50 pages.

Advanced Technology Attachment ATA-2 PC Guide.com dated Jan. 2003; 14 pages.

ATA Short for Advanced Technology Attachment Webopedia.com dated Jan. 2003; 1 page.

Serial ATA Interface on Client Systems Tom Pratt, Dell Computer Corporation dated Jun. 2003; 4 pages.

CY7C68300A Revision *B Cypress Semiconductor Corporation; 2 pages.

EZ-USB FX2 Techincal Reference manual Version 2.1 Cypress Semiconductor Corporation Copyright 2000, 2001; 130 pages.

Universal Serial Bus Specification Revision 2.0 USB Implementers Forum dated Apr. 27, 2000; 85 pages.

International Search Report for International Application No. PCT/US06/33412 mailed Sep. 14, 2007; 1 page.

Written opinion of the International Searching Authority for International Application No. PCT/US06/33412 mailed Sep. 14, 2007; 4 pages.

Compaq et al., Universal Serial Bus Specification, Revision 2.0, Apr. 27, 2000; 9 pages.

West Bridge Antioch USB/Mass Storage Peripheral Controller Cypress Semiconductor Corporation Revised Mar. 14, 2007 Document # 001-07978 Rev *C; 20 pages.

USPTO Notice of Allowance for U.S. Appl. No. 09/671,554 dated Apr. 16, 2003; 7 page.

USPTO Notice of Allowance for U.S. Appl. No. 09/232,578 dated Aug. 24, 2009; 3 pages.

USPTO Non-Final Rejection for U.S. Appl. No. 09/232,578 dated Mar. 13, 2001; 7 pages.

Universal Serial Bus Specification, Revision 1.0, Jan. 15, 1996; 268 pages.

Intel USB Mobile System Design Guidelines, Revision 1pt0, Nov. 6, 1996; 22 pages.

Universal Serial Bus and the Multimedia PC, by Kosar A. Jaff, 1996; 9 pages.

Intel USB Voltage Drop and Droop Measurement, Nov. 18, 1996; 19 pages.

Universal Serial Bus Specification, Revision 1.1 dated Oct. 23, 1998; 327 pages.

USPTO Notice of Allowance for U.S. Appl. No. 09/812,475 dated Aug. 13, 2002; 7 pages.

USPTO Final Rejection for U.S. Appl. No. 09/812,475 dated May 8, 2002; 7 pages.

USPTO Non-Final Rejection for U.S. Appl. No. 09/812,475 dated Oct. 10, 2001; 4 pages.

Lucent Technologies, "USB-720 Instant USB USB-to-IEEE 1284 Bridge," Advance Data Sheet, Rev. dated Nov. 5, 1997; 28 pages.

Lucent Technologies delivers Instant USB for peripherals, press release, Jan. 1997; 3 pages.

USPTO Notice of Allowance for U.S. Appl. No. 09/273,310 dated Dec. 18, 2000; 3 pages.

USPTO Notice of Allowance for U.S. Appl. No. 09/176,047 dated Jun. 26, 2001; 4 pages.

USPTO Non-Final Rejection for U.S. Appl. No. 09/176,047 dated Feb. 28, 2001; 7 pages.

USPTO Notice of Allowance for U.S. Appl. No. 08/886,923 dated Aug. 30, 1999; 9 pages.

USPTO Non-Final Rejection for U.S. Appl. No. 08/886,923 dated Feb. 16, 1999; 8 pages.

USPTO Notice of Allowance for U.S. Appl. No. 09/821,006 dated Aug. 9, 2004; 8 pages.

USPTO Non-Final Rejection for U.S. Appl. No. 09/821,006 dated Mar. 10, 2004; 11 pages.

* cited by examiner

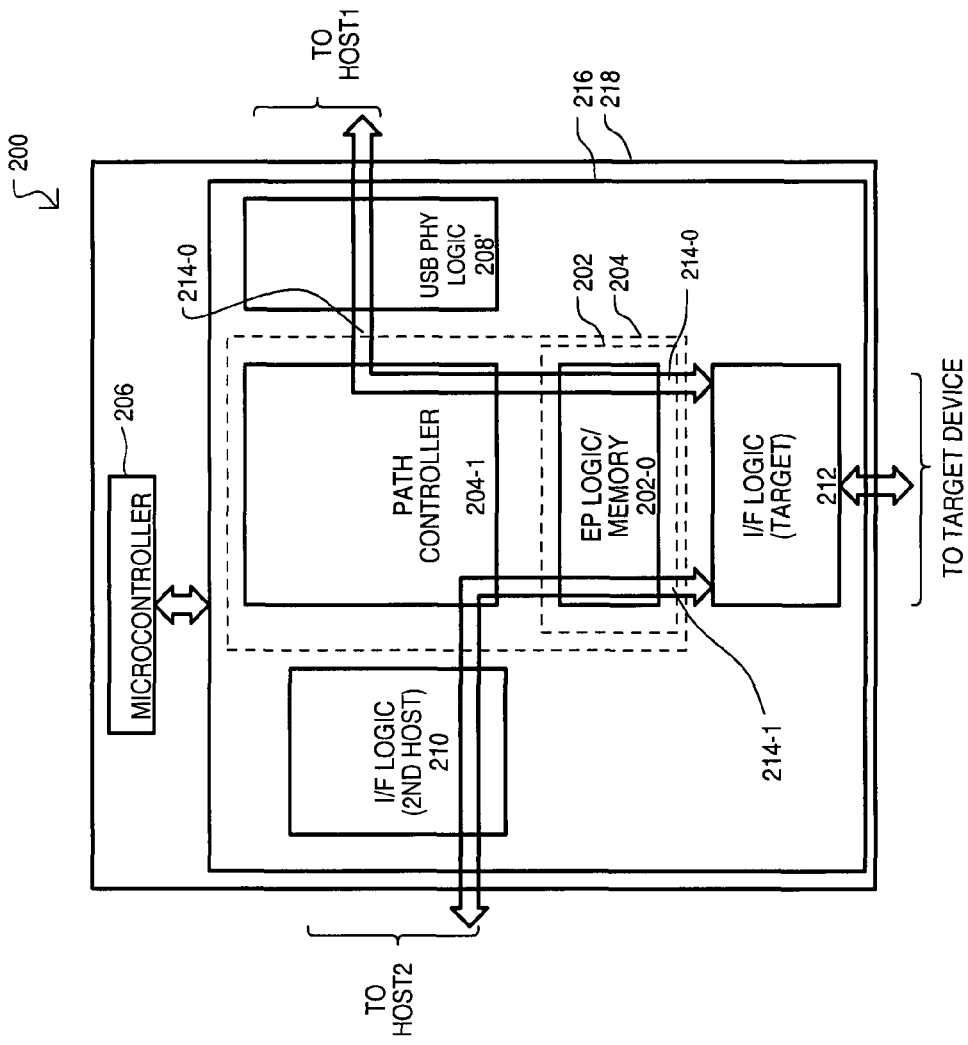
FIG. 2
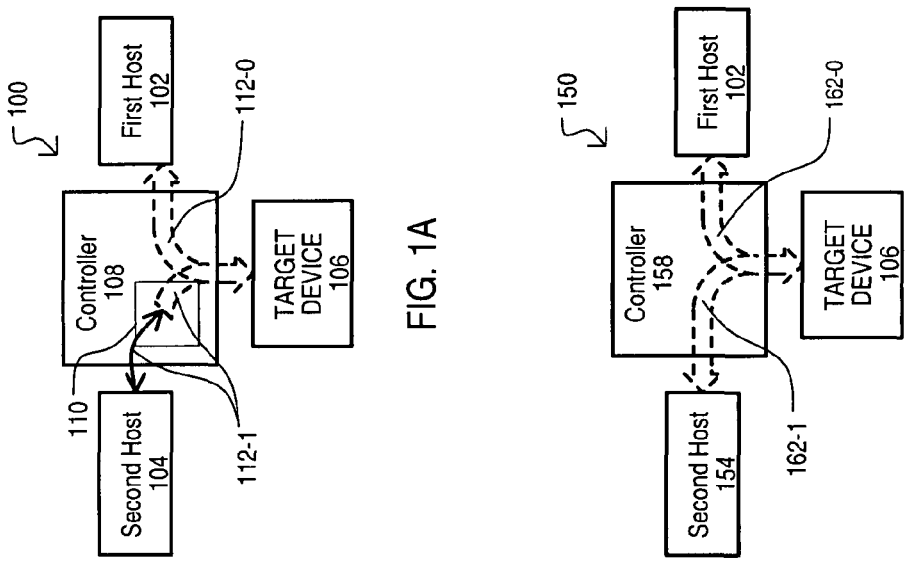
FIG. 1A
FIG. 1B

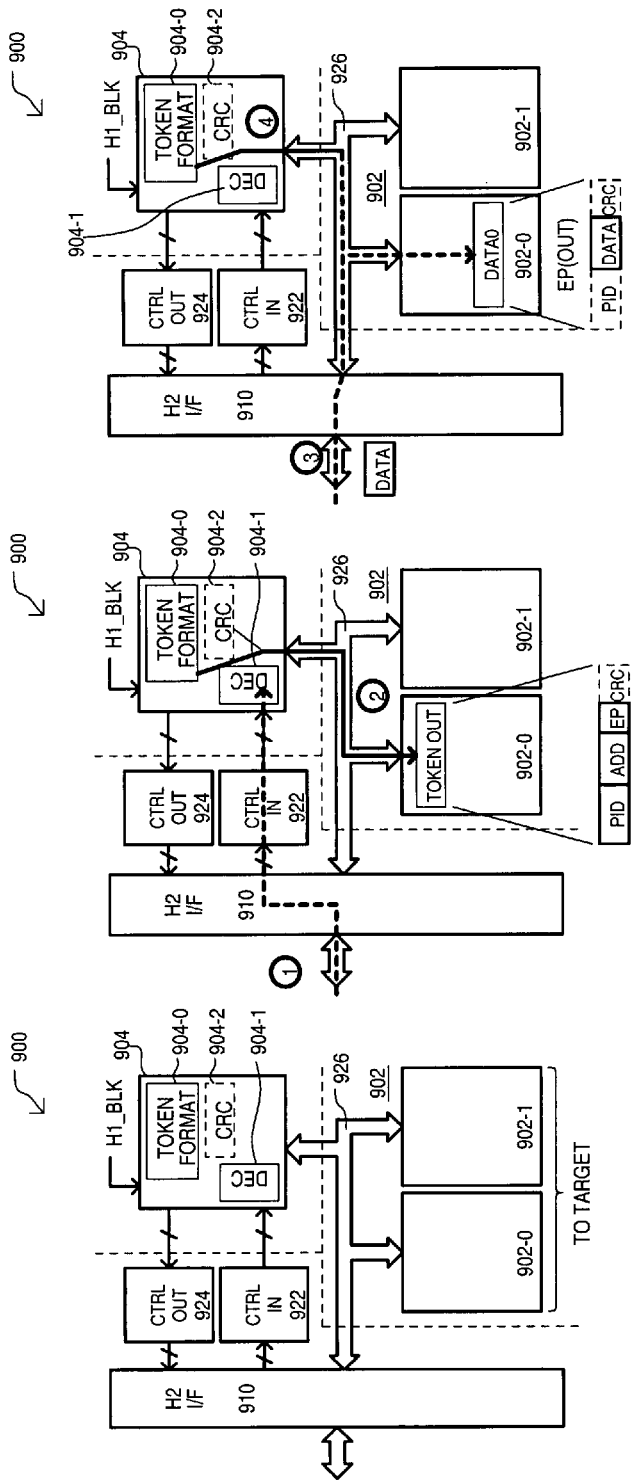

US 7,895,387 B1

DEVICES AND METHODS FOR SHARING COMMON TARGET DEVICE WITH TWO DIFFERENT HOSTS ACCORDING TO COMMON COMMUNICATION PROTOCOL

TECHNICAL FIELD

The present invention relates generally to devices and methods that provide communication paths between host devices and target devices, and more particularly to devices and methods for communicating between a target device and multiple hosts utilizing a common protocol.

BACKGROUND OF THE INVENTION

Communication protocols can allow a "host" computing device (for example a personal computer, laptop computer, etc.) to communicate with one or more target devices. For example, media files can be transferred between media players and a host device, image files can be transferred from a camera to a host device, or input devices can provide input data for the host device (e.g., mouse, game controller, etc.). One popular communication protocol is that included in the Universal Serial Bus (USB) Specification.

Communication protocols can require particular communication formats and sequences between a host and a target device. In many instances, communication protocols can be optimized for data transfer speed and/or efficiency. To take advantage of the benefits achieved by using a communication protocol, target devices can often be designed at a hardware level to accommodate data formats and exchanges in one or more predetermined protocols.

To better understand various aspects of the disclosed embodiments, conventional systems for interconnecting a target device with a host device will now be described with reference to FIGS. 13A and 13B.

FIG. 13A shows a first conventional USB system, designated by the general reference character 1300. Conventional system 1300 can include a USB host device 1302, a USB controller 1304 and a target device 1306. USB host device 1302 communicates with USB controller 1304 via a USB connection 1308. USB controller 1304 can access target device 1306 in response to requests from USB host device 1302. In such an arrangement, the USB host device 1302 accesses the target device 1306 through USB controller 1304. The target device 1306 is not shared with any other host device.

FIG. 13B shows a second conventional USB system, this one designated by the reference character 1330. Conventional system 1330 includes a USB host device 1332 connected to a USB controller 1334, via a USB connection 1338. FIG. 13B also includes a second host device 1333 connected to USB controller 1334 via an interface 1335. A target device 1336 can be accessed by second host 1333. In such an arrangement, USB 1332 host and second host 1333 can communicate with one another, and second host 1333 can have direct access to target device 1336. However, in order for the USB host 1332 to access target device it must do so through second host device 1333.

BRIEF DESCRIPTION OF THE DRAWINGS

FIG. 1 shows a block diagram of a system according to one embodiment of the invention.

FIG. 2 shows a controller circuit according to an embodiment.

FIG. 9 is a block schematic diagram showing a controller circuit portion according to an embodiment.

FIGS. 10A to 10F show various operations that can be performed by the controller circuit portion of FIG. 9.

DETAILED DESCRIPTION

Figure 13A:
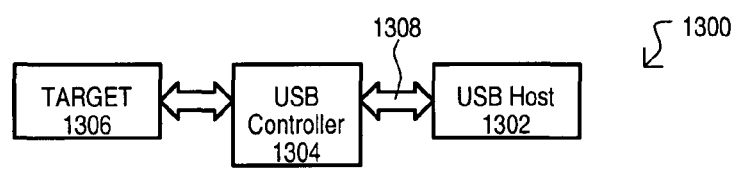
FIGS. 13A and 13B show examples of conventional systems that include a host device and a target device.
Figure 13B:
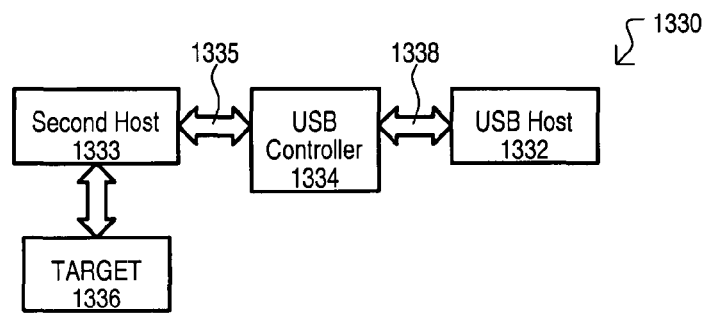

Various embodiments will now be described in detail that show methods and devices that can allow for communication paths to be created between two hosts and a target device utilizing a same communication protocol. In such an arrangement, two different hosts can access a same target device independently, and yet comply with a common communication protocol. Such arrangements can provide for communication speeds improvements over conventional arrangements, like that FIG. 13B, as either host can access a target does without having use the access path of the other host.

Referring now to FIG. 1A, a system according to a first embodiment is shown in a block diagram and designated by the reference character 100. A system 100 can include a first host device 102, a second host device 104, a target device 106, and a controller circuit 108. A first host device 102 can send commands, data and receive responses and data according to a predetermined protocol. In one particular arrangement, a first host device 102 can be a Universal Serial Bus (USB) type host.

A target device 106 can receive commands and data, and in response, execute a predetermined operation. In addition, a target device 106 can output responses indicating the status of a communication flow. A target device 106 can be configured to receive communications, and output communications according to a predetermined protocol. As but one example, target device 106 can send and expect to receive communications according to a protocol, such as the USB protocol.

A second host device 104 can also send commands and data, and receive responses and data. While a second host device 104 can communicate according to same protocol as first host device 102 and target device 106, a system 100 can accommodate a second host device 104 that does not operate according to such a protocol. As but two very particular examples, if first host device 102 communicates via a serial interface (e.g., USB), second host device 104 can communicate via a parallel interface or different type of serial interface.

A controller circuit 108 can provide configurable communication paths between target device 106 and either first host device 102 or second host device 104. Such communication paths are shown as 112-0 and 112-1. A controller circuit 108 can also include a data format section 110. A data format section 110 can alter communications between a second host 104 and a target device 106 to make such communications compatible with the same protocol as that used by first host device 102.

Referring still to FIG. 1, communication path 112-0 can exist between first host device 102 and target device 106. Such a communication path can be according to one protocol, and so is shown by dashed lines. In contrast, while communication path 112-1 can exist between second host device 104 and target device 106, such a communication path can include a data format step introduced by data format section 110. In particular, communication path 112-1 can include a first portion, shown by dashed lines between data format section 110 and target device 106. Communications along this section can be compatible with the same protocol as communication path 112-0. In contrast, a second portion of communication path 112-1, shown by solid lines between second host device 104 and data format portion 110, can be according to a different communication protocol or system.

In this way, a controller circuit 108 can provide direct communication paths between a target device and any one of multiple host devices, where such communication paths operate according to a common protocol with respect to the target device. Such an arrangement can provide for fast response times in the target device as communications with hosts can be direct, and not pass through another host. Still further, such an arrangement can allow a system to accommodate different types of hosts (i.e., hosts that communicate according to different protocols), without having to alter a target device, as a controller circuit 108 can make host communications compatible with the target device regardless of host device protocol.

Referring now to FIG. 1B, a system according to another first embodiment is shown in a block diagram and designated by the reference character 150. A system 150 can have an arrangement similar to that of FIG. 1A, including a first host device 102, a second host device 154, a target device 106, and a controller circuit 158. However, in the arrangement of FIG. 1B, both a first host device 102 and second host device 154 can send commands, data and receive responses and data according to a same predetermined protocol. In one particular arrangement, both a first and second host device (102 and 154) can be USB type hosts.

A controller circuit 158 can provide configurable communication paths between target device 106 and either first host device 102 or second host device 104. Such communication paths are shown as 162-0 and 162-1. Communication paths (162-0 and 162-1) can be according to one protocol, and so are both shown by dashed lines. A controller circuit 158 can receive request to access a target device from a second host 154. If a first host communication path 162-0 is idle, a controller circuit 158 can block access to target device 106, while at the same time providing protocol compliant communications (e.g., STALL or NAK) with a first host device 102. Communication path 162-1 can then be enabled. Similarly, after communication path 162-1 has been enabled, if a second host device 104 wishes terminate access to target device 106, a controller circuit 158 can determine when a first host device 102 is idle, and then can terminate communication path 162-1 and enable communication path 162-0.

In this way, a controller circuit 108 can provide direct communication paths between a target device and any one of multiple host devices according to a common protocol.

Referring now to FIG. 2, a controller circuit according to another embodiment is shown in a block schematic diagram, and designated by the general reference character 200. In very particular arrangements, controller circuit 200 can correspond to that shown as 108 in FIG. 1.

A controller circuit 200 can include an endpoint (EP) storage circuit 202, a switch/control circuit 204, configuration circuit 206, a first host interface (I/F) 208', a second host I/F 210, and a target device I/F 212.

An EP storage circuit 202 can include storage locations divided, or dividable into multiple EP locations. Each such EP location can store a quantifiable amount of data (e.g., data of a given packet length, or payload size). Such EP locations can also be assigned an identification value (e.g., EP number), and configured for a particular direction (e.g., OUT from a host device, or IN toward a host device).

It is noted that an endpoint can be a destination or source of information commonly identifiable by all entities participating in a communication flow (e.g., device, threads, etc.). In the very particular example of the Universal Serial Bus (USB) protocol, an endpoint can be a uniquely addressable portion of a USB device that is the source or sink of information in a communication flow between a host and a target device. Each USB endpoint can have an endpoint number as well as a direction of flow.

In very particular arrangements, the physical implementation of an endpoint can include an endpoint buffer. An endpoint buffer can be a memory circuit that stores data arriving from a host (configured in the OUT direction), or that stores data that can be read out to a host (configured in the IN direction). Thus, a physical endpoint can be circuitry that actually stores data in a communication flow. In particular embodiments, such data can be in a predetermined packet format. According to particular embodiments of the invention, an endpoint buffer can be a first-in-first-out memory (FIFO), with start and end pointers that can dictate where data can be read from or written to. Such endpoint FIFOs can include flags to indicate when the FIFO is ready to be read from or written to.

In the particular example of FIG. 2, EP storage circuit 202 is shown to include EP logic and memory 202-0. EP logic and memory 202-0 can include physical EPs designated for transfer of data between target device I/F 212 and first host I/F 208' and/or second host I/F 210.

A switch/control circuit 204 can provide data paths between the various I/Fs (208', 210 and 212) and EP storage location 202. Such data paths can be configurable according to data provided from configuration circuit 206. Two possible communication paths are shown as 214-0 and 214-1. In the example of FIG. 2, a switch/control circuit 204 can include a path controller 204-1. A path controller 204-1 can enable communication paths between interfaces (e.g., 214-0 and 214-1), and in addition, can alter communications to ensure such communications are compatible with one or more predetermined protocols. In one very particular arrangement, such altering can data formatting operations such as "packing" and "unpacking" of data. "Packing" can include ensuring communication data includes leading or trailing information as required by a protocol. Similarly, "unpacking" can include reading only particular portions of communication, and thus avoiding leading or trailing protocol dependent data or fields. Particular examples of packing and unpacking will be described in more detail below.

In the example of FIG. 2, a configuration circuit 206 can include a processor circuit that can have a processor and associated instruction memory and input/outputs. Configuration circuit 206 can provide configuration signals to path region 216, which can include the interfaces, memory and logic for enabling the various communication paths between I/Fs (208' to 212, 210 to 212). In one very particular example, a configuration circuit can include an embedded (included in the same substrate as path region 216) 8051 microcontroller, or equivalent. However, alternate embodiments can include different types of microcontrollers or processors to control switch paths based on one or more sets of instructions.

In the arrangement of FIG. 2, first host I/F 208' can particularly include USB physical layer logic. Thus, first host I/F 208' can include logic for receiving packet data according to the USB protocol. Second host I/F 210 can connect to a separate host device. For example, second host I/F 210 can provide for communications not compatible with that of first host I/F 208'.

Target device I/F 212 can access a target device to allow either a first host (at first host I/F 208') or a second host (at second host I/F 210) to access functions of the target device. In one particular arrangement, a target device can be compatible with a same protocol as a first host device. That is, operations for a target device are accessed according to a predetermined protocol. As but one very particular example, a target device can be compatible with a USB protocol. In such an arrangement, accesses to the target device can be preceded by "token" communications that indicate an endpoint and direction for a given communication flow to the target device.

As noted above, communication paths that can be created with controller circuit 200 are shown as 214-0 to 214-1. Communication path 214-0 can exist between first host I/F 208 to target device I/F 212, bypassing second host I/F 210. Communication path 214-1 can exist between second host I/F 210 and target device I/F 212, bypassing first host I/F 208'.

Referring still to FIG. 2, a controller circuit 200 is preferably a single integrated circuit formed within a common substrate area 218. Such an arrangement can provide a single "chip" solution to integrating different types of host devices operating according to different protocols or types of communications.

In this way, a controller circuit 200 can provide controllable paths between host I/Fs that can communicate according to different protocols and a common target I/F.

Figure 3:
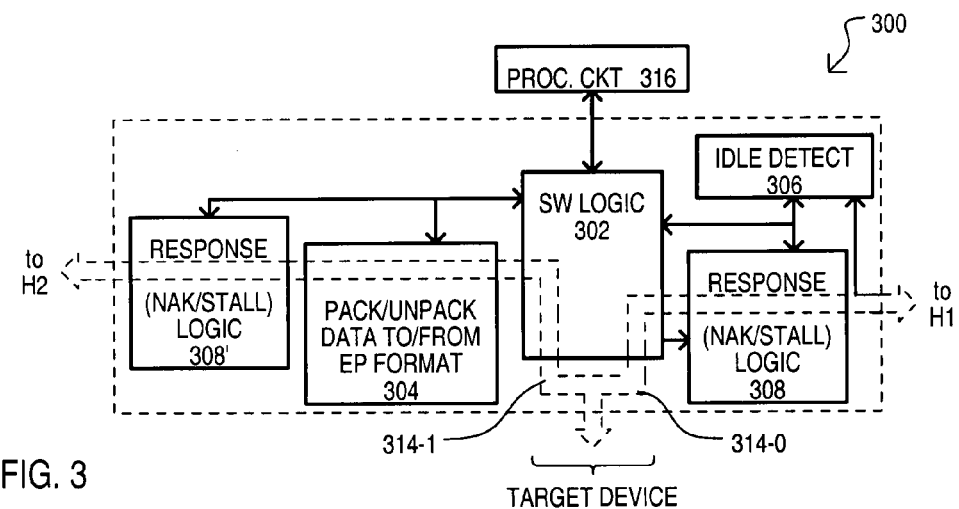
FIG. 3 shows a path controller circuit according to an embodiment.

Referring now to FIG. 3, a path controller circuit according to an embodiment is shown in a block schematic diagram and designated by the general reference character 300. In very particular arrangements, a path controller circuit 300 can correspond to those shown as 204-1 in FIG. 2.

A path controller circuit 300 can include a switch logic section 302, a data format section 304, an idle detect circuit 306, and a response circuit 308. Optionally, a path controller circuit 300 can include a second response circuit 308' for communicating with a second host. A second response circuit 308' can be in addition to, or substituted to data format section 304. Path controller circuit 300 can provide communication paths 314-0 and 314-1. Communication path 314-0 can allow communications to pass between a first host device (H1) and a target device, and can be controlled by response circuit 308 and switch logic section 302. Communication path 314-1 can allow communications to pass between a second host device (H2) and a target device, and can be controlled by data format section 304, second response circuit 308' and switch logic section 302.

A switch logic section 302 can selectively enable communication paths (314-0 and 314-1) and control the operation of data format section 304, idle detect circuit 306, and responses circuits 308 and 308'. In the arrangement shown, a switch logic section 302 can be controlled according to signals received from a configuration circuit 316.

A data format section 304 can receive communications on communication path 314-1, and format such communications for compatibility with one or more predetermined protocols. As but one example, data format section 304 can add/remove data fields, provide byte alignment with respect to data read/writes, and generate entirely new communication packages from predetermined signals. That is, a data format section 304 can provide "packing" and "unpacking" of communications for compatibility between one protocol and another protocol/communication format.

An idle detect circuit 306 can monitor a communication path from/to a first host. If it is determined that such a path is idle (i.e., no communications being received from or sent to a first host), it can generate an idle detect indication. As will be described in more detail below, such an idle detect indication can be used a precondition to allowing access to be enabled from a second host to a target device.

A response circuit 308 can generate communications compatible with a protocol being used by a first host. Under predetermined circumstances (e.g., second host accessing target device) a response circuit 308 can communicate with a first host device in a protocol compliant matter, yet not allow the first host device to access the target device. As but one particular example, a first host can be USB host and a response circuit can issue STALL or NAK responses to a first host in the event a second host seeks to access a target device. In a similar fashion, a second response circuit 308' can operate in the same fashion, but with respect to a second host, and not a first host.

Having described a path controller circuit 300 according to an embodiment, selected operations of such a circuit will now be described with reference to FIGS. 4A to 4D. FIGS. 4A to 4D show operations for a second host that does not communicate according to the same protocol as a first host. In such an arrangements, as second response circuit 308' may be disabled, or in other embodiments, not be included. Accordingly, FIGS. 4A to 4D do not show a second response circuit 308'. It is understood that when a second response circuit 308' is disabled it does not affect communication path 314-1.

Figure 4A:
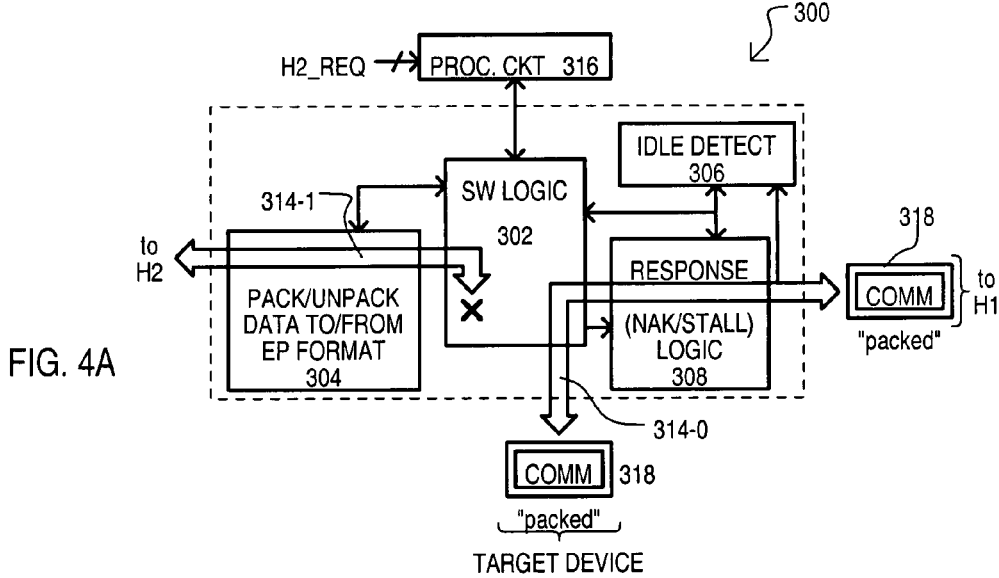
FIGS. 4A to 4D show examples of operations for the path controller circuit of FIG. 3.

FIG. 4A shows an operation in which a second host seeks access to a target device, while a first host is communicating with the target device. In such an arrangement, an active communication path 314-0 can be in place, allowing communications (shown as 318) to flow according to a set protocol. As but one very particular example, communications 318 can be in a predetermined format. Even more particularly, each communication 318 can send a packet that includes a packet identifier field that indicates the type of communication being sent. Because communication path 314-0 is active, idle detect circuit 306 can indicate to switch logic section 302 that a first host input is not idle. In response, switch logic section 302 can maintain communication path 314-1 in a disabled state, preventing a second host from accessing a target device. While in such a state, if a second host requests access to a target device (shown as H2_REQ input to configuration circuit 316), such a request can be denied.

Figure 4B:
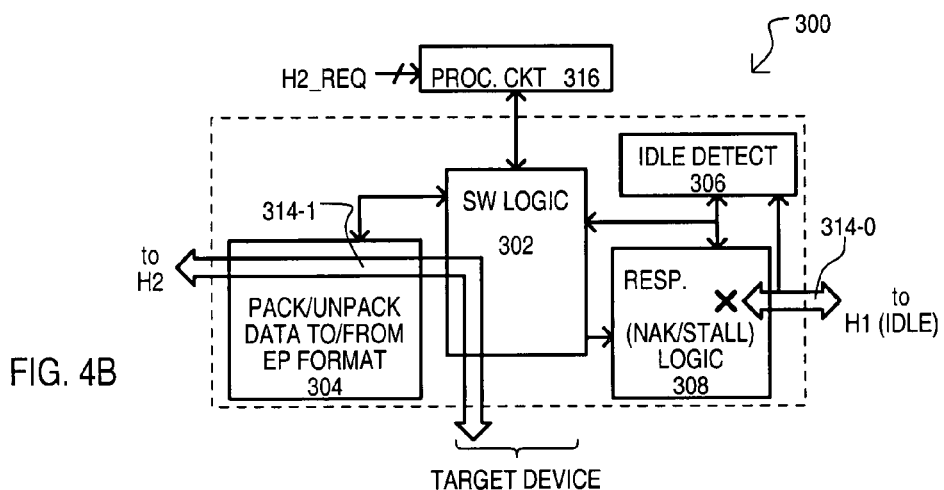

FIG. 4B shows an operation in which access to a target device by a second host device can be set up. In the example shown, it is assumed that the communication path with the first host is idle. This idle state can be detected by idle detect circuit 306, which can provide an idle indication to switch logic section 302. During such an idle state, it is assumed that a second host can request access to a target device (H2_REQ). Because a first host input is idle, switch logic section 302 can disable communication path 314-0, preventing a first host from accessing a target device. At the same time, response circuit 308 can be configured to issue responses to first host communications that comply with the communications protocol, but at the same time, to not acknowledge access to the target device. Once appropriate protocol responses can be generated, and communication path 314-0 is disabled, switch logic section 302 can enable communication path 314-1.

Figure 4C:
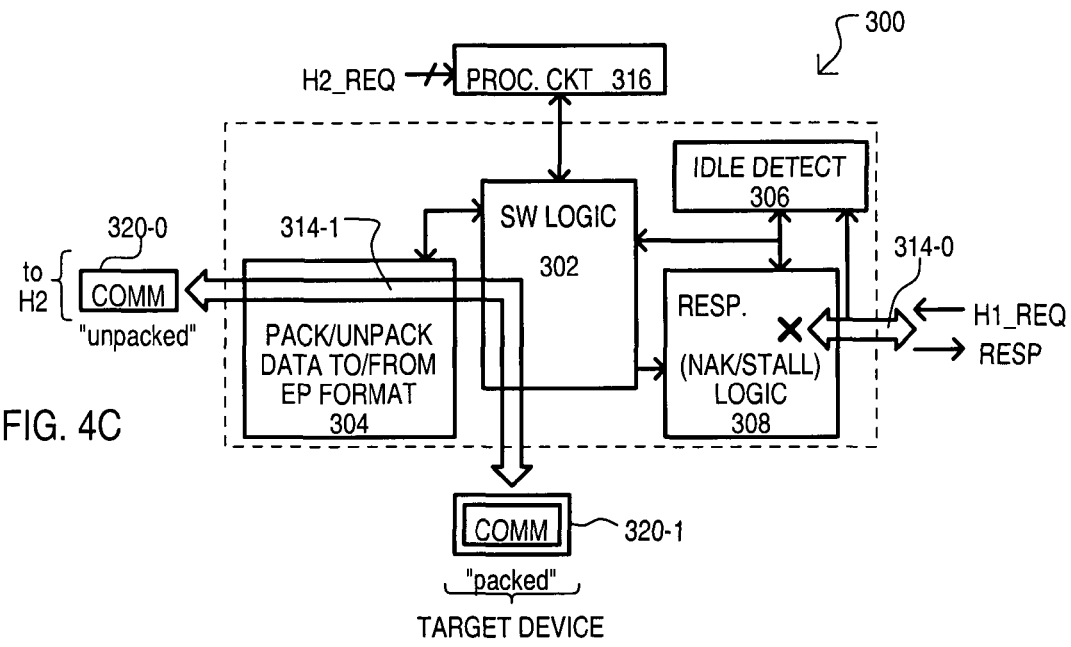

FIG. 4C shows an operation in which a first host seeks to access a target device while a second host is communicating with the target device. In such an arrangement, an active communication path 314-1 can be in place, allowing communications (shown as 320-0/1) to flow between a second host and a target device. However, data format section 304 can be included in such a communication path, formatting data as need. In the very particular example shown, communications 320-0 coming into or out of data format section 304 from a second host direction need not comply with the same protocol. Such communications can be packed by data format section 304 to generate communications 320-1 to or from the target device direction that do comply with the same protocol as those along communication path 314-0. While path controller circuit 300 is operating in such a manner, it is assumed that a first host requests access to the target device (H1_REQ). In response to such a request, response circuit 308 can reply with a response (RESP) according to the protocol, but communication path 314-0 can remain disabled, and communications along path 314-1 can continue.

Figure 4D:
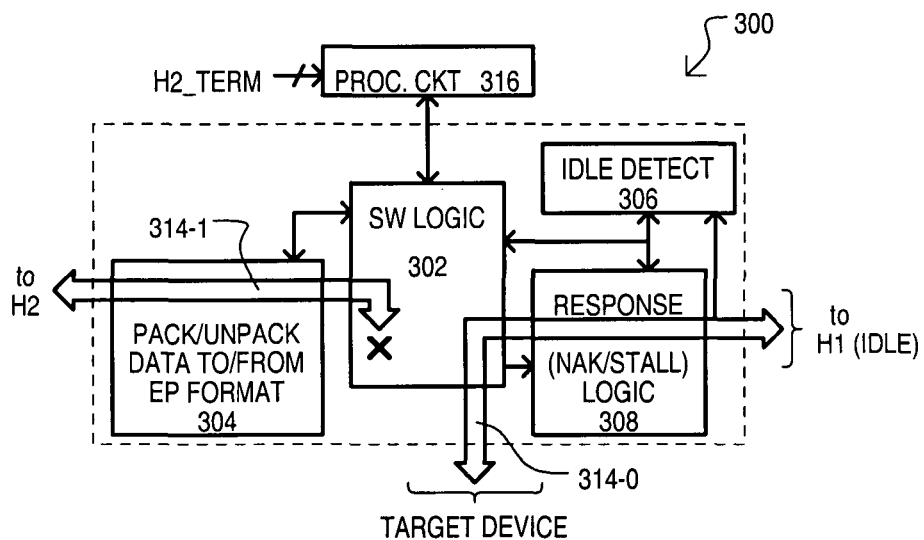

FIG. 4D shows an operation in which access to a target device by a second can be terminated. In the example shown, it is assumed that a communication path with the first host is idle. Idle detect circuit 306 can indicate to switch logic section 302 that a first host input is idle. At this time, it is assumed that second host requests termination of access to a target device (H2_TERM). Because a first host input is idle, switch logic section 302 can disable communication path 314-1, preventing a second host from accessing a target device. At the same time, response circuit 308 can be disabled, and communication path 314-0 enabled communication path with a first host. As a result, communications between a first host and a target device can resume according to the protocol.

In this way, a path control circuit can selectively enable communication paths between different hosts and a common target device, while maintaining protocol compliant communications with a first host at all times.

While FIGS. 4A to 4D show operations for a second host that does not communicate with a same protocol as a first host, other embodiments can include arrangements that allow for a second host to communicate according to a same protocol as a first host. Such an embodiment is shown in FIGS. 4E to 4G.

Figure 4E:
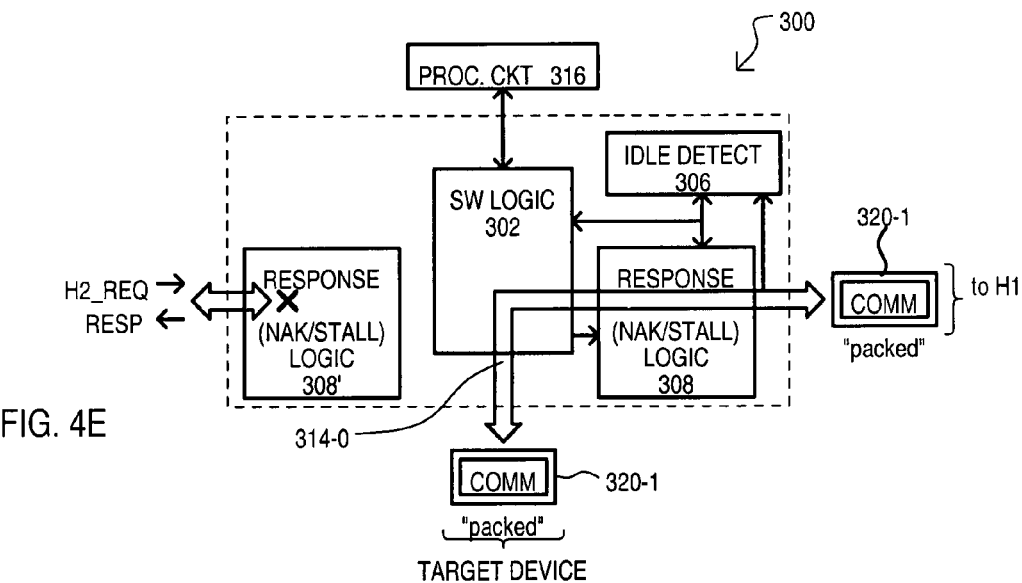

FIG. 4E shows an operation in which a first host is communicating with the target device. As in the case of FIG. 4A, an active communication path 314-0 can be in place, allowing communications (shown as 318) to flow according to a set protocol. However, unlike FIG. 4A, if a second host requests access to the target device (H2_REQ), second response circuit 308' can reply with a response (RESP) according to the same protocol as that of the first host, but not allow the second host to access the target device (e.g., issue a NAK or STALL response).

Figure 4F:
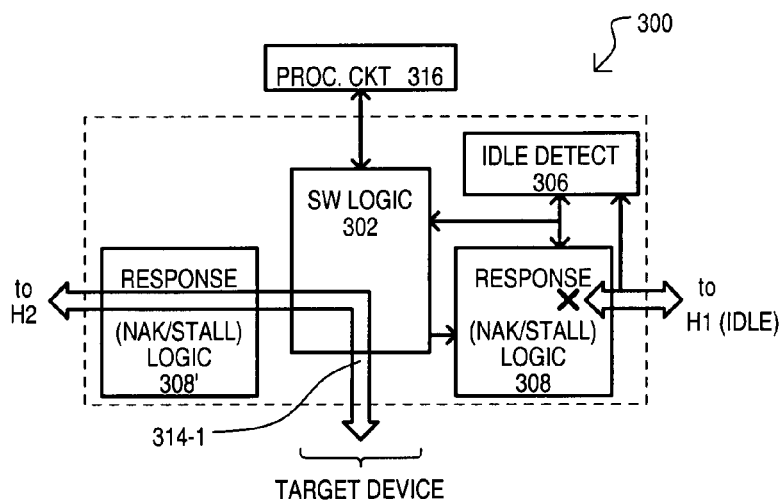

FIG. 4F shows an operation in which access to a target device by a second host device can be set up. In the example shown, it is assumed that the communication path with the first host is idle. This idle state can be detected in the same fashion as FIG. 4B. Because a first host input is idle, switch logic section 302 can disable communication path 314-0, preventing a first host from accessing a target device. At the same time, response circuit 308 can be configured to issue responses to first host communications that comply with the communications protocol, but at the same time, to not acknowledge access to the target device. Once appropriate protocol responses can be generated, and communication path 314-0 is disabled, switch logic section 302 can enable communication path 314-1. As shown in FIG. 4F, such communications can be according to the protocol, and thus are "packed".

Figure 4G:
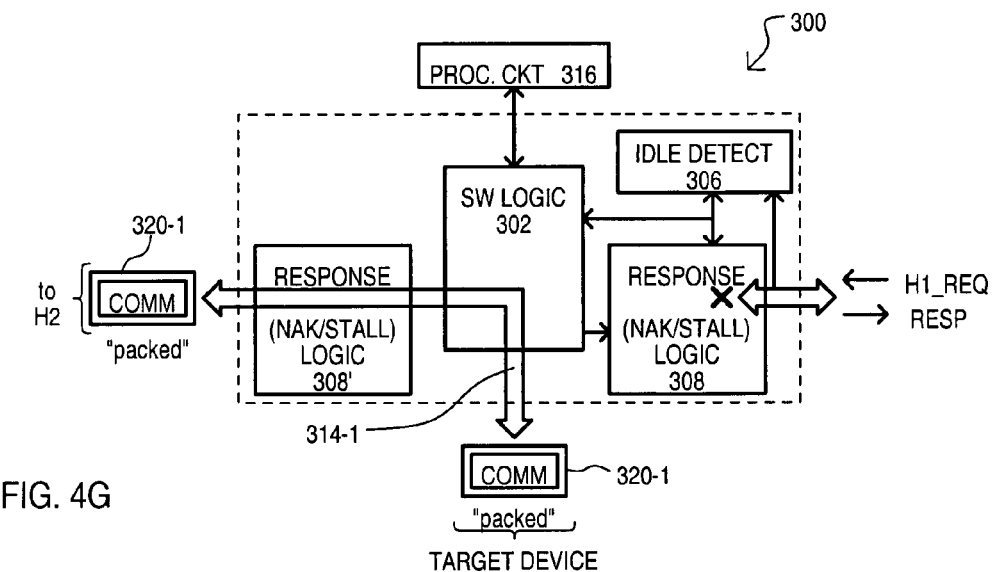

FIG. 4G shows an operation in which a first host seeks to access a target device while a second host is communicating with the target device. In such an arrangement, an active communication path 314-1 can be in place, allowing communications (shown as 320-1) to flow between a second host and a target device. While path controller circuit 300 is operating in such a manner, it is assumed that a first host requests access to the target device (H1_REQ). In response to such a request, response circuit 308 can reply with a response (RESP) according to the protocol, but communication path 314-0 can remain disabled, and communications along path 314-1 can continue.

In this way, a path control circuit can selectively enable communication paths between different hosts operating according to a same protocol, and a common target device, while maintaining protocol compliant communications with a first host at all times.

While the embodiments can include systems, controller circuits, and path control circuits, other embodiments can include methods according to the operations described above. Examples of such method embodiments will now be described with reference to FIGS. 5 and 6. In very particular arrangements, FIGS. 5 and 6 can be methods executed by system, controller circuit and/or path control circuits described in the embodiments shown herein.

Figure 5:
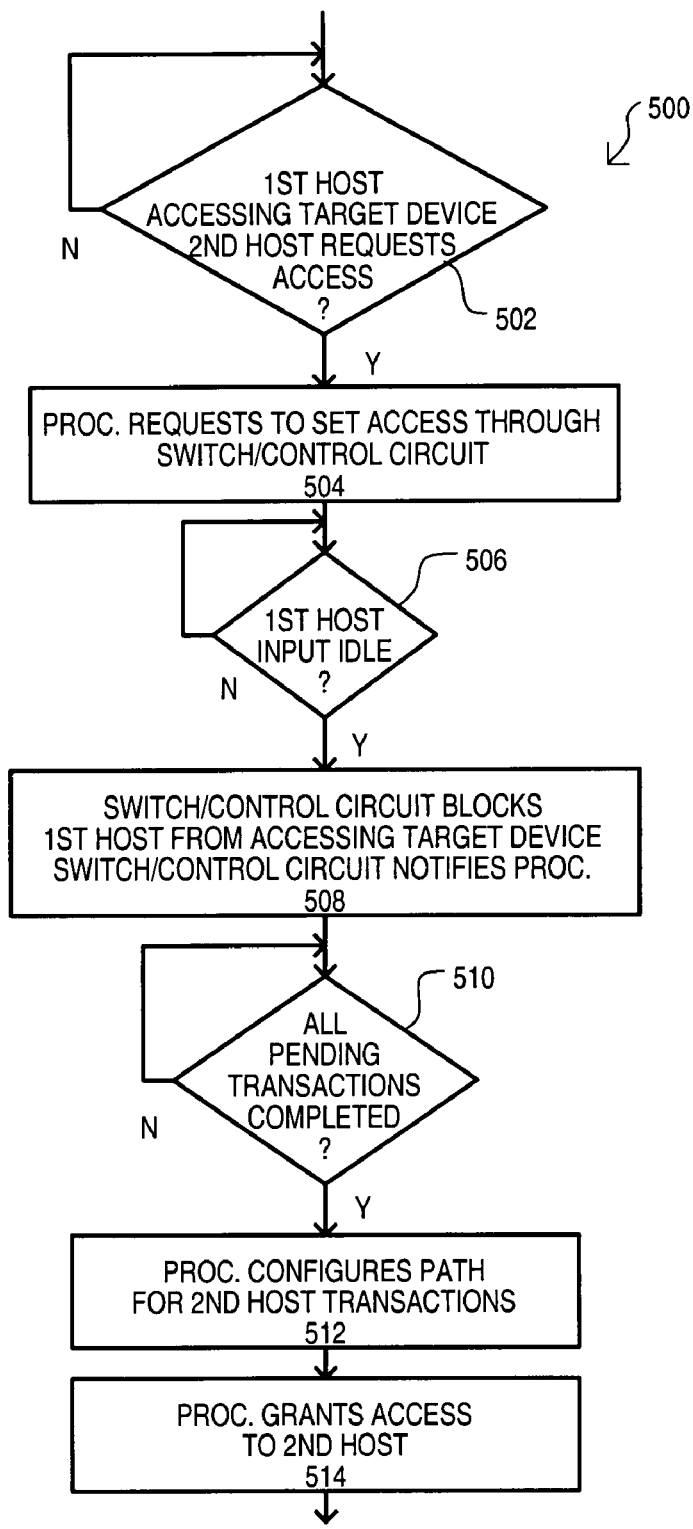
FIG. 5 is a flow diagram showing a host access setup method according to an embodiment.

Referring now to FIG. 5, a method according to an embodiment is shown in a flow diagram and designated by the general reference character 500. A method 500 can show how a communication path between a second host processor and a target device can be set up. A method 500 can include determining if a first host is accessing a target device when a second host requests access to the target device (step 502). If a second host is not request such an access, a method 500 can return to monitoring for requests by a second host (N from 502). If a request is received from a second host (Y from 502), a request can be made to set an access path through a switch control circuit (step 504). Such a request set a communication path from a second host to a target device. In the particular example of FIG. 5, a step 504 can be executed by a processor. In one particular case, such a processor can be a configuration circuit, like that shown as 206 in FIGS. 2 and 316 in FIG. 3.

A method 500 can then determine if a first host input is idle (step 506). If such an input is not idle (N from 506), the first host input can continue to be monitored to detect when an idle condition exists. If a first host input is idle (Y from 506), a switch control circuit can block a first host from accessing a target device and then notify the processor such an action has been completed (step 508).

A method 500 can further including determine if all pending transactions are completed (step 510). Such a step can include examining transactions with a target device, and ensuring that such actions are complete. As but one very particular example, at the same time that a first host input can be idle, data may still be transferring between a buffer and a target device. A step 510 can ensure all such transactions are finished. If all transactions are determined not to be complete (N from 510), transactions can continue to be examined for completion. If all transactions are determined to be complete (Y from 510), a communication path for second host transactions can be configured (step 512). Such a step can enable a communication path between a second host and a target device. In the particular example of FIG. 5, a step 512 can be executed by a processor (i.e., a configuration circuit). A method 500 can then include access being granted to a second host (step 514). FIG. 5 shows this step as being executed by the processor, as well.

In this way, a method can setup access to a target device for a second host, where the target device is also accessible by a first host.

Figure 6:
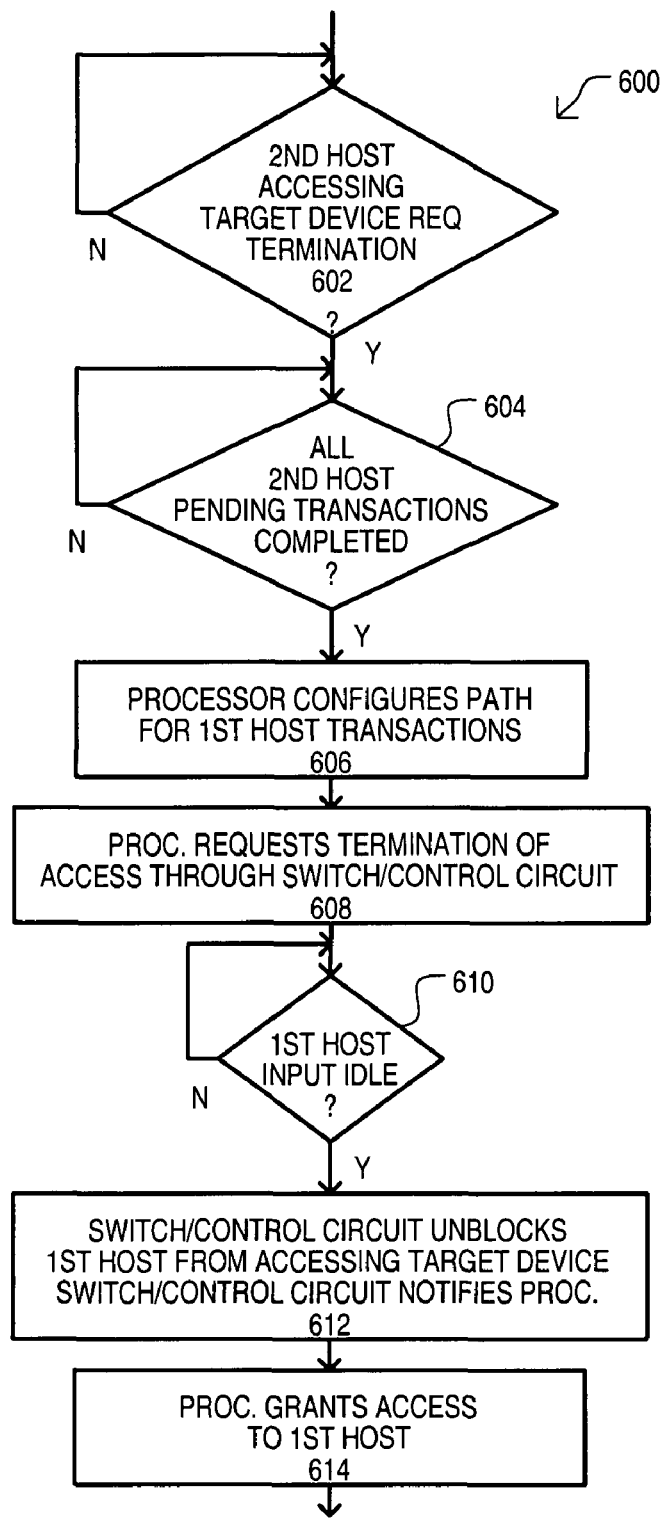
FIG. 6 is a flow diagram showing a host access termination method according to an embodiment.

Referring now to FIG. 6, another method according to an embodiment is shown in a flow diagram and designated by the general reference character 600. A method 600 can show how a communication path between a second host processor and a target device can be terminated. Such a step can return a target device communication path to a first host device.

A method 600 can include determining if a second host device, that was accessing a target device, requests termination of such access (step 602). If a second host is not requesting such a termination, a method 600 can return to monitoring for a termination request (N from 602). If a termination request is received from a second host (Y from 602), a method 600 can determine if all pending transactions are completed (step 604). Such a step can be similar to that shown as 510 in FIG. 5. If all transactions are determined not to be complete (N from 604), transactions can continue to be examined for completion. If all transactions are determined to be complete (Y from 604), a communication path for first host transactions can be configured (step 606). Such a step can enable a communication path between a first host and a target device. In the particular example of FIG. 6, a step 606 can be executed by a processor (i.e., a configuration circuit). A method 600 can continue with termination being requested of a switch control circuit (step 608). FIG. 6 shows this step as being executed by the processor.

A method 600 can then determine if a first host input is idle (step 610). If such an input is not idle (N from 610), the first host input can continue to be monitored to detect when an idle condition exists. If a first host input is idle (Y from 610), a switch control circuit can unblock a first host access to a target device and then notify the processor such an action has been completed (step 612). A method 600 can then include access being granted to a first host (step 614). FIG. 6 shows this step as being executed by the processor, as well.

In this way, a method can terminate access to a target device for a second host, where the target device is also accessible by a first host.

As noted above in the description for FIG. 3, a path control circuit can include a response circuit 308. One example of a response circuit operation is shown in a state diagram in FIG. 7, and designated by the general reference character 700. Operation 700 is particularly directed to a protocol that utilizes "tokens". In the example shown, a token can indicate an endpoint for a communication flow. In a more particular example, a token can also indicate a communication direction.

Figure 7:
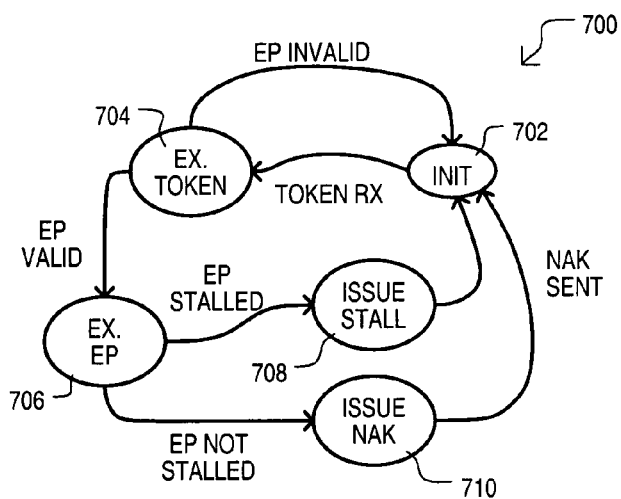
FIG. 7 is a state diagram showing an operation of a response circuit that can be included in embodiments.

Referring still to FIG. 7, once placed in operation (first host communication path disabled and second host communication path enabled), a response circuit operation 700 can enter an initial state 702. Upon receiving a token (TOKEN RX), the token can be examined (state 704). Such an examination can determine if the token identifies a valid endpoint location. If an endpoint of the token is not valid (EP INVALID), an operation 700 can return to the initial state 702, ignoring the token. However, if an endpoint is valid (EP VALID), the status of the endpoint can be examined (state 706). If the endpoint is stalled (EP STALLED), a "STALL" response can be issued (state 708). A stalled endpoint can be one that is in use by a second host, for example. If the endpoint is not stalled (EP NOT STALLED), a non-acknowledgment response can be issued (state 710). States 708 and 710 can return to initial state 702 ("STALL SENT" or "NAK SENT").

In this way, a response circuit can issue protocol compliant responses (i.e., STALL, NAK) in response to first host tokens directed to valid endpoints, to ensure such endpoints are available to a second host.

Figure 8:
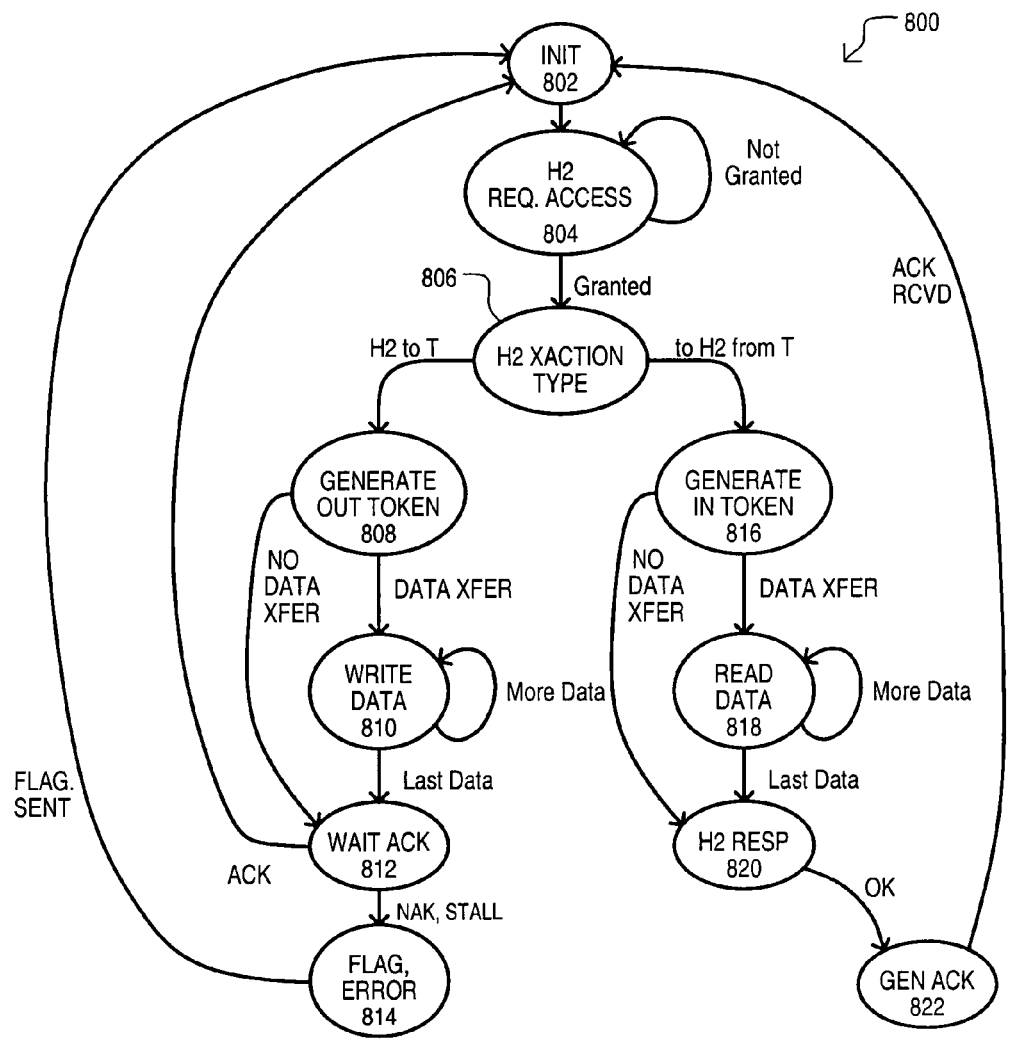
FIG. 8 is a state diagram showing an operation of a data format section that can be included in embodiments.

Embodiments described above have included a data format section 110 of FIG. 1, and 304 in FIG. 3. One example of a data format section operation is shown in FIG. 8 in a state diagram. FIG. 8 is particularly directed to a protocol that utilizes "tokens", like that of FIG. 7. In the example of FIG. 8, it is assumed that a token can indicate an endpoint for a communication flow as well as a direction for such a flow. Further, state diagram illustrates an operation 800 that can "pack" and "unpack" communications between a second host (H2) and a target device to enable target device to communicate according to the protocol, while the second host does not communicate according to the protocol.

Referring to FIG. 8, once placed in operation, a data format operation 800 can enter an initial state 802. An operation can then determine if a second host is requesting access to a target device (state 804). If such access is not granted ("Not Granted"), an operation 800 can continue to monitor for second host requests. If access by the second host is granted ("Granted"), an operation 800 can examine the transaction type being requested by a second host (state 806).

As shown in FIG. 8, if a second host transaction type includes communications from a second host to a target device ("H2 to T"), an OUT token can be generated (state 808). As but one particular example, an OUT token can include a series of data fields compatible with a predetermined protocol that indicate a destination for a data transfer (i.e., endpoint), as well as the direction of such a data transfer (from second host to target device "OUT"). If a transaction indicated by the OUT token includes data transfer (DATA XFER), data received from a second host can be written to a location indicated by the OUT token (state 810). In one particular embodiment, such data can also be "packed" into a predetermined protocol format. Even more particularly, such data can include a leading identifier field that indicates the packet is a data packet. If more data needs to be written ("More Data"), an operation can return to state 810.

Once a last data value has been written ("Last Data") or if the original transaction was not a data transfer transaction (NOT DATA XFER), an operation can wait for an acknowledgement from a target device (state 812). If an acknowledgement is received (ACK), an operation can return to initial state 802. If an acknowledgement is not received (NAK, STALL), an operation can generate a flag or error indication to the second host (state 814). An operation can then return to initial state 802 (FLAG SENT), and a second host can retry the operation.

Referring still to FIG. 8, if a second host transaction type includes communications from a target device to a second host ("to H2 from T"), an IN token can be generated (state 816). As but one particular example, an IN token can include a series of data fields compatible with a predetermined protocol that indicate a destination for a data transfer (i.e., endpoint), as well as the direction of such a data transfer (from the target device to the second host IN). If a transaction indicated by the IN token includes data transfer (DATA XFER), data received from a target device can be read from a location by the second host indicated by the IN token (state 818). In one particular embodiment, such data can also be "unpacked" to avoid reading unnecessary data introduced by a protocol format. Even more particularly, such data can be read by excluding a leading identifier field that indicates the packet is a data packet. If more data needs to be read ("More Data"), an operation can return to state 818.

Once a last data value has been read ("Last Data") or if the original transaction was not a data transfer transaction (NOT DATA XFER), an operation can wait for a response from a second host (state 820). If a host response indicates the operation was complete (OK), an acknowledgement can be generated (state 822). Such an acknowledgement can comply with the same protocol as the generated IN and OUT tokens. Following the generation of the acknowledgement, an operation can return to initial state 802 (ACK RCVD).

In this way, a data format section can generate tokens and other protocol compliant communications to allow a second host to access a same target device as a first host, where the second host does not necessarily communicate according to the same protocol as the first host.

Having described a data format section operation, a very particular example of a data format section, and related circuit sections will now be described with reference to FIG. 9. In one embodiment, a controller circuit portion 900 that can include endpoint (EP) logic/memory section 902, data format section 904, a second host I/F 910, input control circuit 922 and output control circuit 924. In very particular embodiments, a controller circuit portion 900 can be part of a controller circuit like that shown as 108 in FIG. 1 and/or that shown as 200 in FIG. 2. In addition, in particular embodiments, a data format section 904 can be like that shown as 304 in FIG. 3.

EP logic/memory section 902 can include a number of EP buffers that can act as physical endpoints locations. FIG. 9 shows two EP buffers 902-0 and 902-1, however it is understood that more EP buffers could be included. EP buffers (902-0 and 902-1) can receive data from a second host I/F 910 and a data format section 904 on a data bus 926. EP buffers (902-0 and 902-1) can be read from, or written to, by a target device (not shown). Such access may be according to data bus 926. Alternatively, EP buffers (902-0 and 902-1) can be multiport memories, and a target device can access them by way of a different port than that connected to data bus 926.

A data format section 904 can include a token format circuit 904-0 and a decoder/encoder circuit 904-1. Optionally, a data format section 904 can include an error check circuit 904-2. A token format circuit 904-0 can be memory and/or logic that enables tokens to be generated according to a predetermined protocol. Thus, in response to granted requests from a second host, a token format circuit 904-0 can be accessed to generate data fields according to a protocol. A decoder/encoder circuit 904-1 can decode signals received from a second host device to determine the type of operation requested (e.g., data IN or data OUT). Similarly, decoder/encoder circuit 904-1 can encode responses received from a target device into output signals for a second host. An error check circuit 904-2 can generate an error check value calculated according to a given protocol. For example, an error check value may need to be generated from token format data, or from data received from a second host and data format section. In one very particular example, an error check circuit 904-2 can generate a cyclic redundancy check (CRC) type code.

A data format section 904 can also receive a first host block indication H1_BLK that can signify that access to a target device from a second host has been granted.

A second host interface 910 can enable a second host to access endpoint locations of a controller circuit. An input control circuit 922 can translate signals received from a second host into input signals for data format section. Similarly, an output control circuit 924 can translate communications received from a target device into output signals for a second host.

Figures 10C, 10D, 10E:
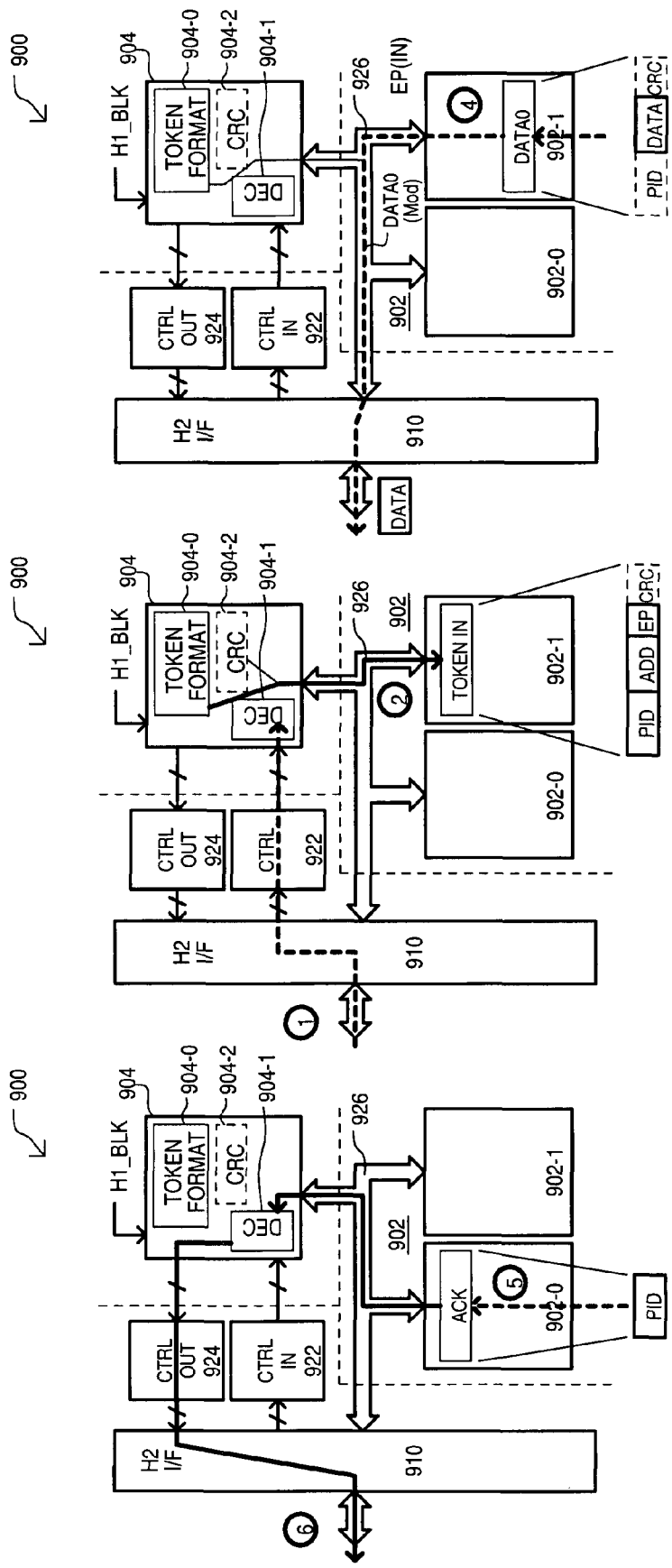
Figure 10F:
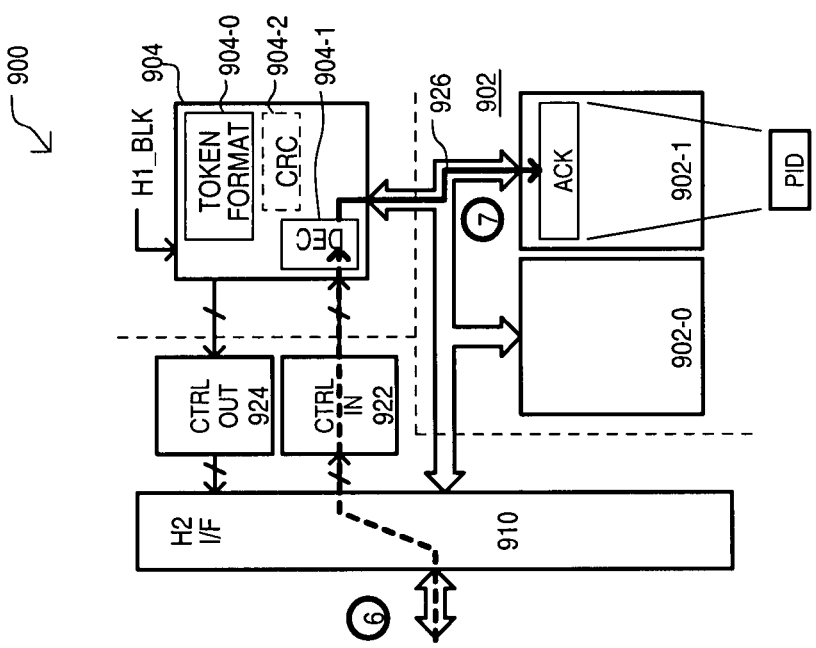

Having described circuit sections for a controller circuit portion 900 according to one particular embodiment, operations for such a circuit portion will now be described with reference to FIGS. 10A to 10F. FIGS. 10A to 10C show one example of a data OUT operation. FIGS. 10D to 10F show one example of a data IN operation.

Referring to FIG. 10A, in a data OUT operation, a second host can generate predetermined control signals indicating a data OUT operation is to take place. A data OUT operation is understood to include the transfer of data out from the second host to the target device. Such control signals can pass through second host I/F 910 and input control circuit 922 to data format section 904. Such an operation is shown by dashed line (1).

A data format section 904 can decode such signals and thus determine the type of operation (e.g., data OUT) as well as the destination of the operation (e.g., device and endpoint). With such information, a data format section 904 can access a token format section 904-0 to generate an OUT token corresponding to the access requested by the second host. Optionally, error check circuit 904-2 can generate an error check code for the token. A data format section 904 can then write the OUT token to an EP buffer 902-0 for subsequent reading by the target device. In the very particular example shown, such an OUT token can include a packet identifier (PID) field that indicates the type and direction of operation, an address field (ADD) that indicates the operation is directed to the target device, an endpoint address (EP) that identifies a logical endpoint for data. Optionally, an OUT token can include an error code (CRC). Such an operation is shown by solid line (2).

Referring to FIG. 10B, after an OUT token has been read by a target device, a second host can transfer data to the endpoint location indicated by the previous OUT token. In the example shown, the EP buffer 902-0 corresponds to the indicated endpoint. Data written into EP buffer 902-0 can be read out by a target device. Such an operation is shown by dashed line (3). Optionally, data format section 904 can add additional protocol compliant data fields to data received from a second host. In the example shown, such additional fields can include a PID field (which can identify a data packet), as well as an error code (CRC). Such an operation is shown by solid line (4).

Referring to FIG. 10C, after all data OUT operations are completed, a target device can return a response communication. Such a response can be an acknowledgement (ACK), non-acknowledgement (NAK), or stall (STALL) response, as but a few examples. In the particular example shown, a target device returns an ACK response. The ACK response can include a PID field. Such an operation is shown by dashed line (5). A data format section 904 can read the ACK response, and encode the response into signals for output to second host device. Such an operation is shown by solid line (6).

Referring now to FIG. 10D, in a data IN operation, a second host can generate predetermined control signals indicating a data IN operation is to take place. A data IN operation is understood to include the transfer of data into the second host from the target device. Such control signals can pass through second host I/F 910 and input control circuit 922 to data format section 904. Such an operation is shown by dashed line (1). With such information, a data format section 904 can access a token format section 904-0 to generate an IN token in the same general fashion as an OUT token, described above. Such an operation is shown by solid line (2).

Referring to FIG. 10E, after an IN token has been read by a target device, a target device can transfer data to the endpoint location indicated by the IN token. In the example shown, the EP buffer 902-1 corresponds to the indicated endpoint. Such data can be read to second host. Such an operation is shown by dashed line (4). It is noted that data received from a target device can include data fields necessary for complying with a predetermined protocol. In the event a second host is not operating according to such a protocol, such extraneous data fields (with respect to the second host) may not be placed on the data bus. As but one example, a data format section 904 can control how data is read from an endpoint buffer out to a second host, or the second host itself may modify a read operation.

Referring to FIG. 10F, assuming that all data IN operations were completed successfully, a second host can input control signals indicating so. Such an operation is shown by dashed line (6). In response to the control signals, a data format section 904 can access a token format section 904-0 to generate an acknowledgement response (ACK) compliant with the given protocol used by the target device. A data format section 904 can then write the ACK response to an EP buffer 902-1, for subsequent reading by the target device. In the very particular example shown, such an ACK response can include a packet identifier (PID) field. Such an operation is shown by solid line (7).

In this way, a controller circuit can generate communications between a host device and a target device that are compliant with a predetermined protocol, even when the host device does not communicate according to the protocol.

Figure 11:
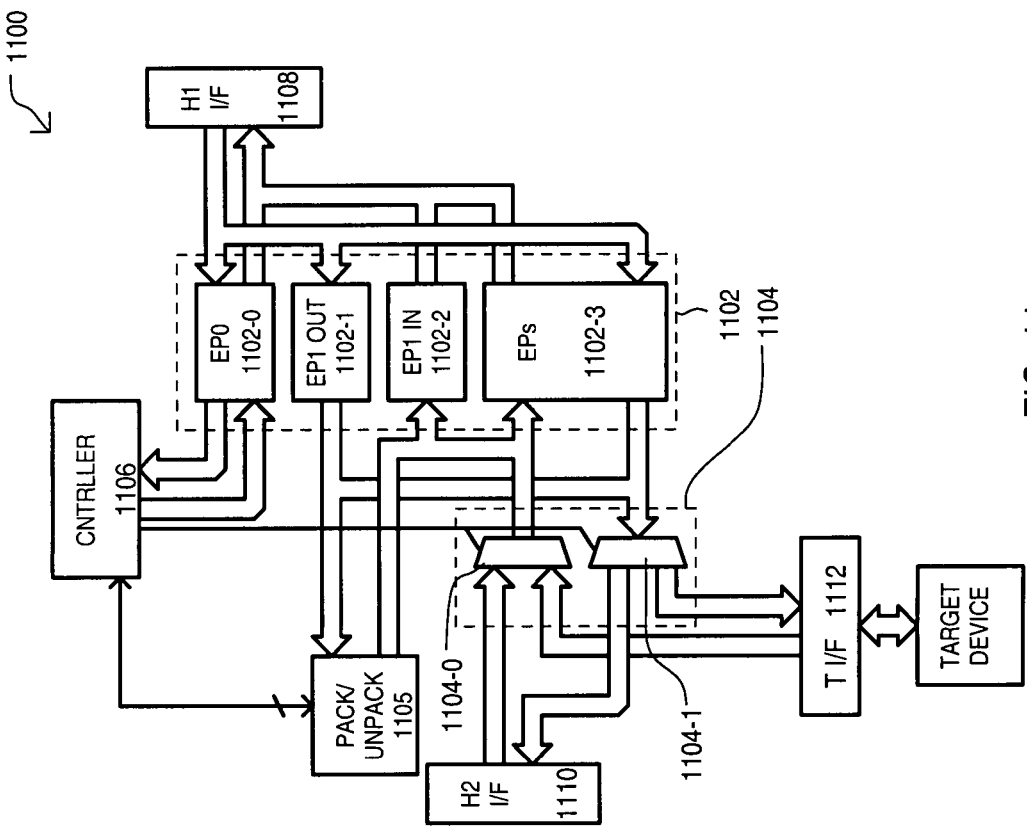
FIG. 11 is a block schematic diagram of a controller circuit according to another embodiment.

Referring now to FIG. 11, a controller circuit according to another embodiment is shown in a block schematic diagram, and designated by the general reference character 1100. In very particular arrangements, controller circuit 1100 can correspond to that shown as 108 in FIG. 1 or that shown in FIG. 2. A controller circuit 1100 can include some sections like those of FIG. 2, thus like sections are referred to by the same reference character but with the first digit being "11" instead of a "2".

FIG. 11 can differ from FIG. 2 in that EP storage circuit 1102 includes three set endpoints, as well as a configurable endpoint space. The set endpoints can include an EP0 1102-0, configured in both an IN and OUT direction, EP1 1102-1 configured in an OUT direction, and EP1 1102-2 configured in an IN direction. Configurable EP space 1102-3 can be configured into one or more endpoints, with varying characteristics. As but a few examples, such characteristics can include buffer size, direction (e.g., IN or OUT), or manner of storing data (e.g., single, double or quad buffering). The various EPs can provide indications when data blocks of certain sizes have been written into the buffer and/or read from the buffer. Thus, EPs can generate indications when an entire packet of data has been received or read, to thereby indicate the EP is available for more data.

In the particular example of FIG. 11, switch/control circuit 1104 can be conceptualized as including a multiplexer (MUX) path 1104-0 and a de-MUX path 1104-1 that can be controlled by configuration circuit 1106. Such an arrangement can allow for dynamic switching of data paths between EP storage circuit 1102 and either of second host I/F 1110 or target device I/F 1112.

The particular example of FIG. 11 also shows a data format section 1105 connected to EP storage circuit 1102. A data format section 1105 can operate in manner shown in FIG. 8 and in the examples of 10A to 10F.

As shown, EP storage circuit 1102 can be accessed by a first host I/F 1108. In addition, the EP storage circuit 1102 can also be accessed by either the second host I/F 1110 or the target device I/F 1112 by operation of switch/control circuit 1104. Thus, switch control circuit 1104 can have one configuration when EP buffers are being accessed by a second host device, and can have another configuration when EP buffers are being accessed by a target device.

In this way, a switch controller circuit can provide communication paths between a first host I/F, second host I/F and a target device I/F.

As noted above in the description of FIG. 3, a path control circuit can include an idle detection circuit that can determine when an input from a first host is idle. One very particular example of an idle detect circuit is shown in FIG. 12.

Figure 12:
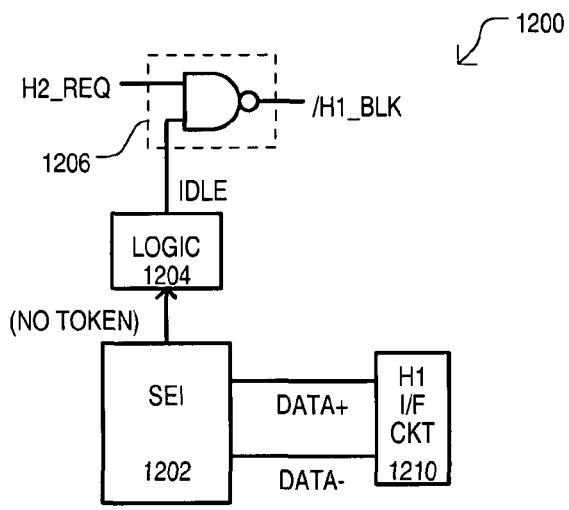
FIG. 12 is a block schematic diagram of an idle detect circuit that can be included in embodiments.

Referring to FIG. 12, one example of an idle circuit is shown in a block schematic diagram and designated by the general reference character 1200. An idle detect circuit 1200 can include a physical interface circuit 1202, a serial interface engine 1204, logic 1206, and a block signal generation circuit 1208.

A physical interface circuit 1202 can generate one or more serial data streams received from communications received from a host. Such serial data can be organized by a serial interface engine (SIE) 1204 to determine the type of communication received. In the particular example shown, SIE 1204 can output a value indicating if no token has been received. Such value can be received by a logic circuit 1206 which can generate an idle indication IDLE, when appropriate.

A block signal generation circuit 1208 can generate a first host block access signal /H1_BLK. In the particular example shown, a first host block signal /H1_BLK can be generated according to the logical combination of a second host request signal H2_REQ and the signal IDLE. In very particular embodiments, a first host block signal /H1_BLK can be used to activate a response circuit like that shown as 308 in FIG. 3 and/or a data format section like that shown as 314 in FIG. 3.

In this way, an idle detect circuit can determine when a host device is idle, in order to enable a second host device to communicate with a target device.

Embodiments of the present invention can be well suited to performing various other steps or variations of the steps recited herein, and in a sequence other than that depicted and/or described herein.

For purposes of clarity, many of the details of the various embodiments and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A controller circuit, comprising:
   a first host idle detection circuit configured to determine when a first host interface (I/F) is in an idle state, the idle state being when the first host I/F is not communicating with the controller circuit;
   a switch controller circuit configured to enable communication paths between the first host I/F, a second host I/F, and a target device I/F; and
   a first response circuit coupled to the first host I/F and configured to:
      output a response when the controller circuit has enabled the communication path between the second host I/F and the target device I/F,
      disable the communication path between the first host I/F and the target device I/F when the first host I/F is in the idle state and a target device is being accessed via the second host I/F, and
      respond to communications received via the first host I/F while the target device is being accessed via the second host I/F,
   wherein the first host I/F is configured to communicate with the switch controller circuit using a first communication protocol, the second host I/F is configured to communicate with the switch controller circuit using a second different communication protocol, and the target device I/F is configured to communicate with the switch controller circuit using a universal serial bus (USB) protocol.

2. The controller circuit of claim 1, further comprising:
   a format circuit configured to generate communication tokens in response to requests from the second host I/F, each communication token corresponding to at least one communication protocol and including a type field indicating a type of communication.

3. The controller circuit of claim 2, wherein:
   the type field indicates a communication direction between the second host I/F and the target device I/F, and each communication token further includes an endpoint field that identifies a memory location.

4. The controller circuit of claim 1, further comprising: a second response circuit coupled to the second host I/F and configured to:
   output responses from the second host I/F in response to communications received by the second host I/F, and
   output responses when the controller circuit has enabled the communication path between the first host I/F and the target device I/F and disabled the communication path between the second host I/F and the target device I/F.

5. The controller circuit of claim 4, wherein:
   the responses output by the first response circuit comply with the first communication protocol and the responses output by the second response circuit comply with the second communication protocol.

6. The controller circuit of claim 1, wherein:
   the first response circuit is configured to respond to at least one of the communications received via the first host I/F by outputting a stall response or no acknowledge (NAK) response by the first I/F while the target device is being accessed via the second host I/F.

7. The controller circuit of claim 1, further comprising:
   a plurality of endpoint storage locations coupled to the first host I/F, the second host I/F, and the target device I/F by the communication paths.

8. A method comprising:
   determining whether a first host device is accessing a target device using a first communications protocol;
   blocking access to the target device from the first host device when the first host device is not accessing the target device and a second host device is accessing the target device, while continuing to respond to communications received from the first host device requesting to access the target device;
   receiving a token from the second host device, the token indicating a communications endpoint, a communications direction, and a second communications protocol; and
   establishing communications between the second host device and the target device using the communications endpoint, the communications direction, and the second communications protocol, wherein the second communications protocol is different than the first communications protocol.

9. The method of claim 8, wherein:
   the determining whether the first host device is accessing the target device includes determining whether the first host device is idle.

10. The method of claim 8, further comprising:
    generating at least one response by the second host device responsive to receiving at least one request to access the target device.

11. The method of claim 8, further comprising:
    determining whether any pending transactions involving the target device are complete before establishing communications between the second host device and the target device.

12. The method of claim 8, further comprising:
    determining whether any pending transactions involving the target device are complete responsive to receiving a request to terminate access to the target device from the second host device.

13. The method of claim 12, further comprising:
    enabling communications between the first host device and the target device responsive to determining that all pending transactions involving the target device are complete.

14. The method of clam 12, further comprising:
    determining whether the first host device is accessing the target device; and unblocking the second host device's access to the target device when the first host device is not accessing the target device.

15. A computer readable memory comprising computer executable instructions, that when executed by a processor, perform a method comprising:
    receiving a control signal from a first host device, the control signal requesting access to a target device;

determining whether the target device is being accessed by a second host device, when the target device is not being accessed by the second host device:

generating a token responsive to the control signal, the token including a communication direction and an endpoint location associated with the target device;

examining the token to determine whether the token identifies a valid endpoint location and when the token identifies a valid endpoint, examining a status of the end point location;

writing the token to the endpoint location responsive to determining that the endpoint location is valid and the endpoint is not being accessed by the second host device; and transferring data from the first host device to the endpoint location indicated by the token; and when the target device is being accessed by the second host device, responding to the control signal received from the first host device with a stall response or a no acknowledge (NAK) response.

16. The computer readable memory of claim 15, wherein the token further includes a packet identifier field, an address field, and an endpoint address.

17. The computer readable memory of claim 15, wherein the generating a token comprises generating an IN token responsive to a request to transfer data from the target device to the first host device, and generating an OUT token responsive to a request to transfer data from the first host device to the target device.

18. The computer readable memory of claim 15, further comprising preventing the first host device from accessing the endpoint location responsive to the second host device accessing the endpoint location.

* * * * *